TOPICAL HEADINGS OMITTED

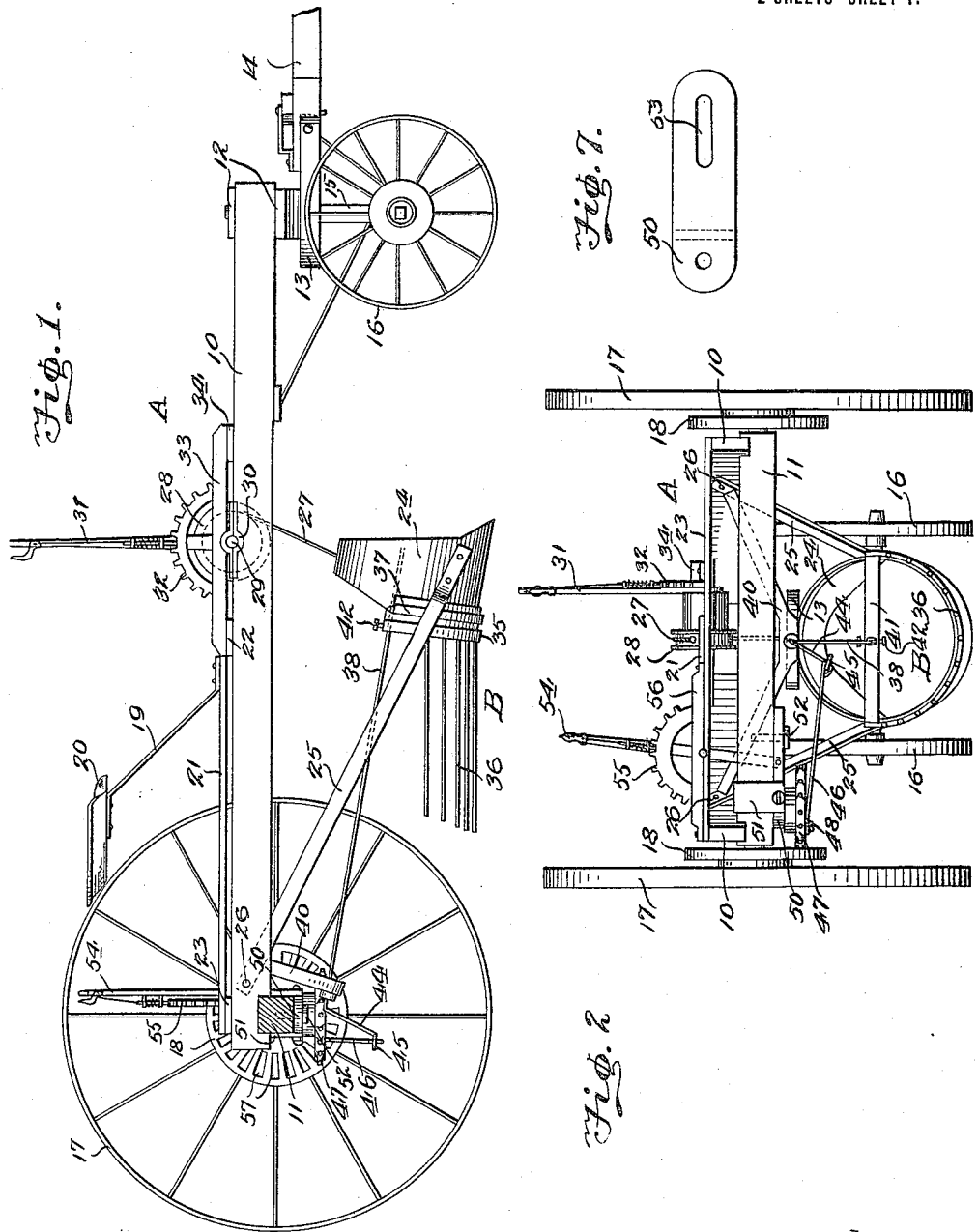

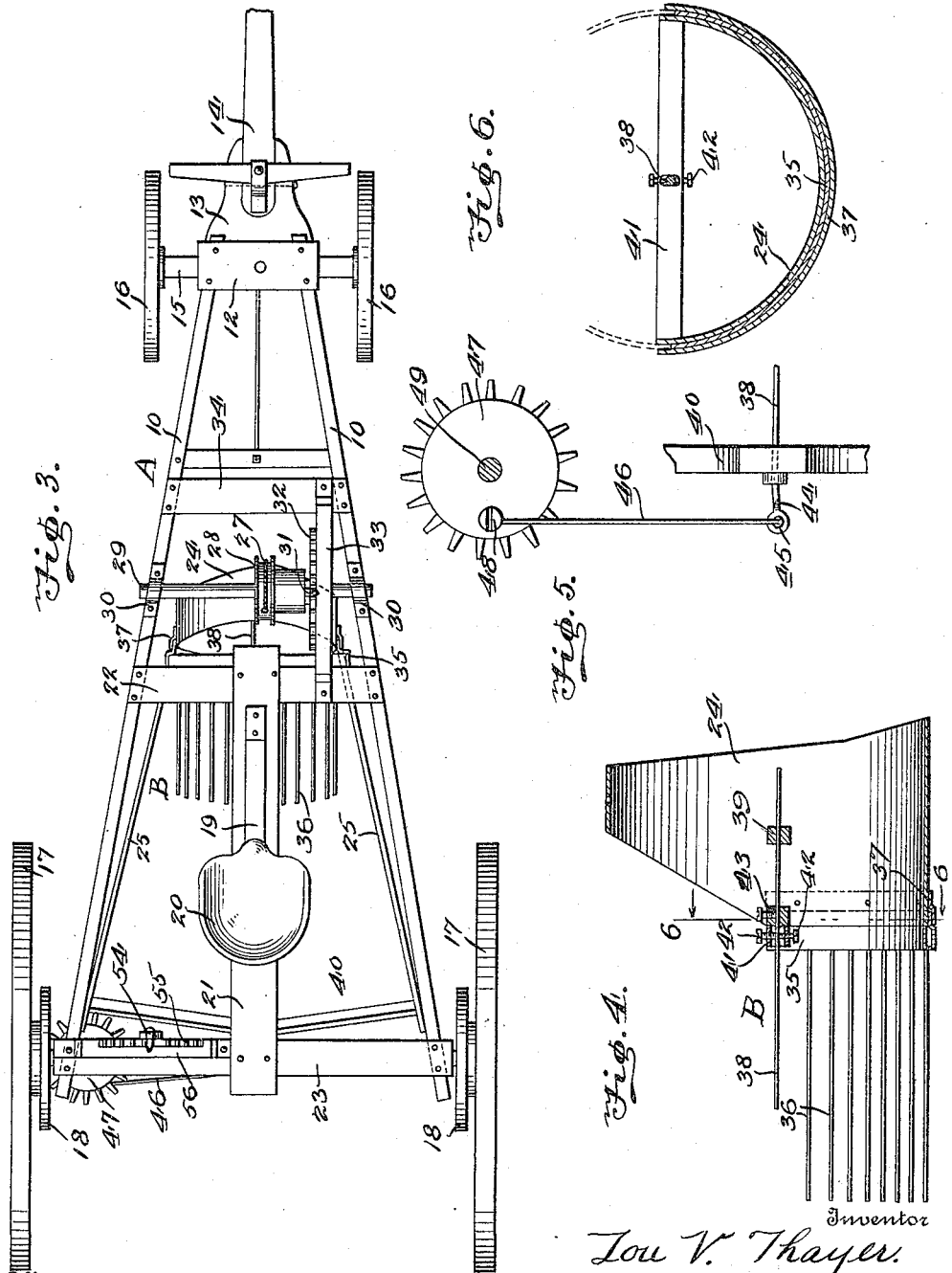

UNITED STATES PATENT OFFICE.

LOU V. THAYER, OF JAMESTOWN, PENNSYLVANIA.

POTATO-DIGGER.

1,169,367. Specification of Letters Patent. Patented Jan. 25, 1916.

Application filed July 7, 1915. Serial No. 38,533.

*To all whom it may concern:*

Be it known that I, Lou V. THAYER, a citizen of the United States, residing at Jamestown, in the county of Mercer and State of Pennsylvania, have invented certain new and useful Improvements in Potato-Diggers, of which the following is a specification.

This invention relates to an improved potato digger and the principal object of the invention is to provide an improved type of digging shovel and shaking frame and to also provide improved means for operating the shaking frame.

Another object of the invention is to provide an improved means for movably connecting the shaking frame with the digging shovel so that the frame or basket will receive a rocking motion transversely of the machine frame.

Another object of the invention is to provide improved means for adjustably mounting the wheel forming part of the same which may be moved into and out of an operative position.

Another object of the invention is to provide improved means for mounting the digging shovel so that it may be vertically adjusted.

This invention is illustrated in the accompanying drawings, wherein:—

Figure 1 is a view showing the machine in side elevation, the rear axle being shown in section. Fig. 2 is a view showing the machine in rear elevation. Fig. 3 is a view showing the machine in top plan. Fig. 4 is an enlarged vertical sectional view through the digging shovel and shaking basket. Fig. 5 is an enlarged fragmentary view of the actuating means for the shaking basket. Fig. 6 is a sectional view taken along the line 6—6 of Fig. 4. Fig. 7 is an enlarged plan view of the plates with which the ratchet wheel shown in Fig. 5 is connected to slidably mount the ratchet wheel.

The frame of this machine which is designated in general by the letter A is provided with the side bars 10 having their rear end portions supported by the axle 11 and their forward end portions connected by the cross bars or bolsters 12 and supported by the truck 13. This truck 13 carries the tongue 14 and includes an axle 15 upon which the forward wheels 16 are mounted. The rear wheels 17 which are mounted upon the rear axle 11 are provided with disks 18 for a purpose to be hereinafter described. In order to provide a support for the standard 19 of the driver's seat 20 there is provided a longitudinally extending bar 21 which is supported at its forward and rear ends by means of the cross bars 22 and 23 respectively.

The digging shovel 24 is carried between the forward ends of the hanger bars 25, the hanger bars being pivotally connected with the side bars 10 of the frame as shown at 26 in Fig. 1. In order to permit of adjustment for the shovel there has been provided a line or cable 27 which has one end secured to the shovel and has its opposite end portion wound upon the drum 28 mounted upon the shaft 29. This shaft 29 is rotatably connected with the side bars 10 of the machine frame by means of bearings 30 and carries a latch lever 31 the tooth of which engages the teeth of the rack or segment 32 carried by the longitudinally extending supporting bar 33 which bar has one end secured to the cross bar 22 and its forward end secured to the cross bar 34. It will thus be seen that by moving the latch lever 31 the shovel can be raised or lowered and thus the extent to which it will dig into the ground regulated.

As the shovel passes along the row of potatoes it will lift the potatoes from the ground and will of course carry dirt along with the potatoes. In order to separate the potatoes from the earth the shaker basket indicated in general by the letter B has been provided. This basket has a collar 35 which carries the teeth 36 and is oscillatably connected with the rear end portion of the shovel 24 by means of the supporting sleeve 37. Therefore this basket will be permitted to oscillate and by rolling the potatoes back and forth across the teeth, shake the potatoes loose from the dirt. Therefore the potatoes will be clean and furthermore will be separated from the earth and can be easily gathered and placed into a suitable receptacle for removal from the field. The actuating mechanism for this rocking basket includes the rocker shaft or rod 38 which has its forward end portion journaled in the bearing of the supporting bar 39 carried by the shovel 24 and has its rear end portion journaled in the bearing of the yoke or hanger bracket 40, the hanger bracket being supported from the rear end portions of the hanger bars 25. This rocker shaft passes through the cross bar 41 of the basket, the basket being securely held to the rod by means of the set screws 42 on bottom and top of rod and by adjusting these set screws the shaker basket can be changed to more slant or level, and additionally held against movement upon the rod in one direction by means of the abutment block 43. The rear end portion of this rocker shaft 38 extends beyond the hanger bracket 40 and is bent to form the crank handle 44 which terminates in the eye 45 which receives the hooked end of the link 46. This link 46 is pivotally connected with the ratchet wheel or gear wheel 47 by means of the pin 48 and as the ratchet wheel 47 is rotated through the medium of one of the disks 18 the link 46 will be caused to reciprocate thus rocking the shaft or rod 38 and causing the basket to oscillate. In order to permit the wheel 47 to be moved into and out of an operative position its supporting pin or axle 49 is carried by the plate 50 which is slidably connected with the rear axle 11 by means of yoke 51 and pin 52 which passes through the longitudinally extending slot 53 of the plate. The latch lever 54 is carried by the rear cross bar 23 and has its lower end connected with the plate so that the plate will be moved longitudinally along the rear axle 11 when the latch lever is moved. The tooth of this latch lever 54 engages the teeth of the rack or segment 55 carried by the plate 56 mounted upon the cross bar 23 and thus the latch lever 54 may be releasably held in an adjusted position.

When in use the draft animals will be hitched to the machine and the levers 31 and 54 moved to raise the digging shovel out of engagement with the ground and move the ratchet wheel 47 to an inoperative position. The machine will then be driven to the field from which it is desired to remove the potatoes and after the machine has been placed in a position to straddle a row the lever 31 will be moved to permit the shovel to drop the desired amount, after which the lever 54 will be moved to bring the teeth of the wheel 47 into a position to extend into the openings 57 of the disks 18. The machine will now be driven across the field and the shovel will pass beneath the potatoes thus removing them from the hill and causing the potatoes and a certain amount of the dirt to pass into the basket. The actuating mechanism for the basket will cause the basket to oscillate transversely of the machine thus moving the potatoes and dirt from one side of the basket to the other as the potatoes move toward the free ends of the teeth 36. By the time the potatoes reach the free ends of the teeth they will be separated from the dirt and will be deposited in a row upon the field. If it noticed that the machine is digging too deep or if not deep enough the lever 31 can be moved to adjust the shovel to the proper position thus preventing danger of the potatoes being cut and also preventing too much dirt from being dug up by the shovel. When the end of the row is reached the shovel can be raised and if desired the actuating mechanism for the basket can be rendered inoperative while the machine is being turned. It is not necessary to render the basket inoperative unless desired as the actuating mechanism for the basket will operate irrespective of the angle of the hanger bars 25. Both of the wheels 17 have been provided with a disk 18 although only one is used so that if it would be more convenient for the operator of the machine the lever 54 may be placed upon the right-hand side of the machine instead of the left-hand side.

What is claimed is:—

1. A potato digging machine comprising a frame, hanger bars carried by said frame, a digging element carried by said bars, a shaking basket oscillatably connected with said digging element, a hanger bracket carried by said bars, a rocker shaft oscillatably carried by said hanger bracket, said shaker basket being rigidly mounted upon said rocker shaft, and means for rocking said shaft to cause said shaker basket to oscillate.

2. A potato digging machine comprising a frame, a digging element, a bearing carried by said digging element, a movably mounted support for said digging element, a bearing carried by said support, a rocker shaft oscillatably carried by said bearing, a shaking basket oscillatably carried by said digging element and rigidly mounted upon said rocker shaft, and actuating means for said rocker shaft to operate the same and cause said shaking basket to oscillate.

3. A potato digging machine comprising a frame, a digging element, an oscillatably mounted rocker shaft, a shaking basket oscillatably carried by said digging element and rigidly connected with said rocker shaft, and means for oscillating said rocker shaft to cause said shaking basket to oscillate.

4. A potato digging machine comprising a frame, a digging element, a shaker basket comprising a collar, teeth extending from said collar, a sleeve carried by said digging element and engaging the collar of said shaker basket to oscillatably connect the basket with said digging element, and means for oscillating said shaker basket.

5. A potato digger comprising a frame, a digging element, a shaker basket, a rocker shaft connected with said shaker basket and having one end portion bent to provide a crank, and actuating means connected with the crank of said crank shaft to move said crank shaft and cause said shaker basket to oscillate.

6. A potato digging machine comprising a frame including a supporting axle, wheels mounted upon said axle, a disk carried by one of said wheels and provided with openings, a plate mounted upon said axle, a wheel rotatably connected with said plate and having teeth fitting into the openings of said disk, a digging element, an oscillatably mounted shaker basket, a crank shaft connected with said shaker basket, and a link eccentrically connected with said wheel and connected with said crank shaft to actuate the crank shaft when the disk is rotated.

7. A potato digging machine comprising a frame, supporting wheels for said frame, a disk carried by one of said wheels and provided with openings, a digging element, an oscillatably mounted shaker basket, a crank shaft for said shaker basket, a slidably mounted plate, a wheel rotatably connected with said plate and provided with teeth for fitting into the openings of said first mentioned disk, a link connected with said crank shaft and with said wheel, and means for moving said plate to move the disk thereof into and out of engagement with the teeth of said disk.

8. A potato digging machine comprising a frame including side bars, cross bars connecting said side bars, an adjustably mounted digging element, means carried by said frame for releasably holding said digging element in an adjusted position, a shaker basket movably connected with said digging element, a rocker shaft connected with said shaker basket, actuating means for said rocker shaft, and means for moving said actuating means into and out of an operative position.

In testimony whereof I affix my signature in the presence of two witnesses.

LOU V. THAYER.

Witnesses:
ROBERT E. ROWLEY,
OLIVER C. JONES.

Copies of this patent may be obtained for five cents each, by addressing the "Commissioner of Patents, Washington, D. C."